Figure 1:
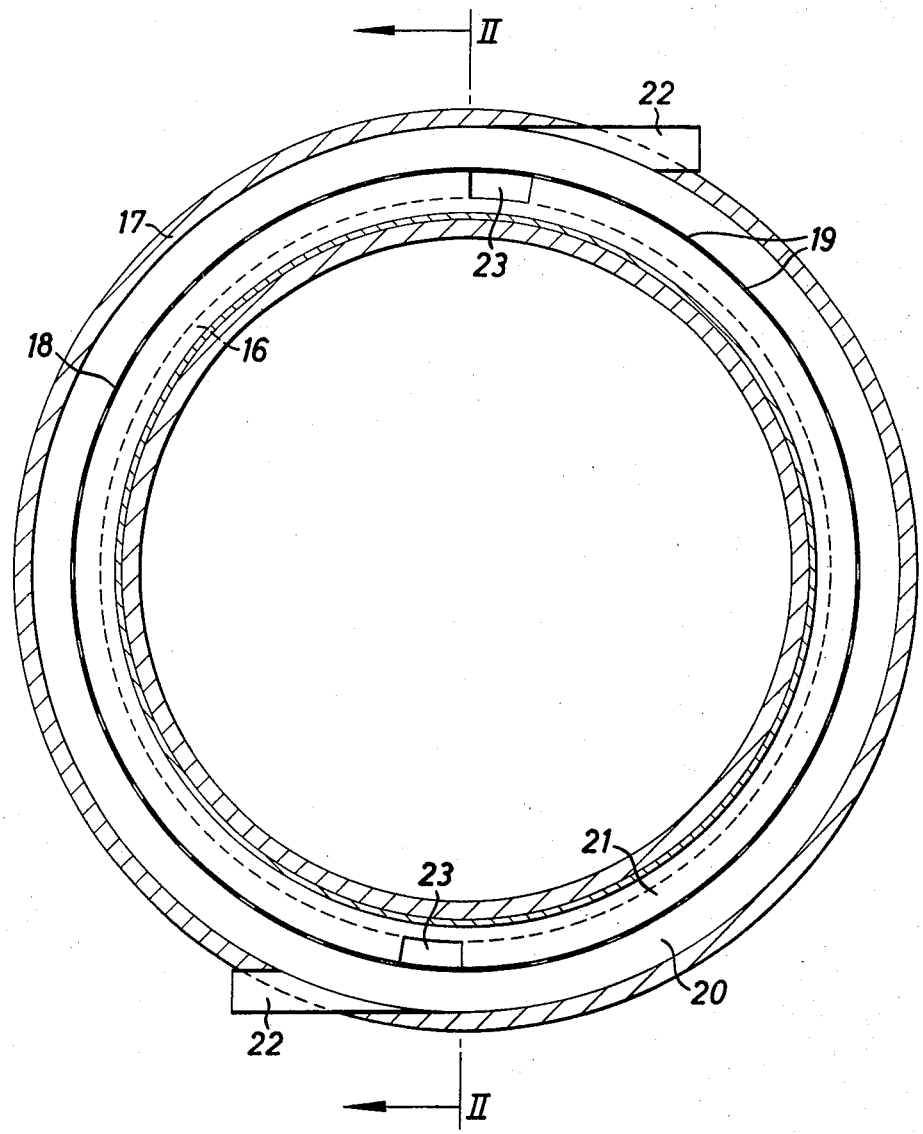

United States Patent [19]
Hemingway et al.

[11] 3,829,284
[45] Aug. 13, 1974

[54] HEAT TREATMENT APPARATUS

[75] Inventors: Maurice Hemingway, Mirfield; Trevor Ward, Dewsbury, both of England

[73] Assignee: Hotwork Limited, Dewsbury, Yorkshire, England

[22] Filed: May 29, 1973

[21] Appl. No.: 364,282

[52] U.S. Cl................ 432/183, 432/225, 432/231
[51] Int. Cl........................ F27b 3/02, F27b 17/00
[58] Field of Search..................... 432/183, 225, 231

[56] References Cited
UNITED STATES PATENTS

| | | | |
|---|---|---|---|
| 911,373 | 2/1909 | Brinkman | 432/225 |
| 2,809,265 | 10/1957 | Jackson | 432/225 X |
| 3,074,704 | 1/1963 | Ronay | 432/225 |

*Primary Examiner*—John J. Camby
*Attorney, Agent, or Firm*—Edwin E. Greigg

[57] ABSTRACT

A welded joint between two pipes is stress relieved by injecting gaseous exhaust from two gas burners at high velocity into a ring through diametrically opposed inlets. The ring has an inwardly opening annular mouth which surrounds the welded joint and is separated from the inlets by an apertured distribution ring which divides the interior of the ring into inner and outer annular enclosures. The gases are injected tangentially with respect to the ring so that they circulate around the outer enclosure and pass to the inner enclosure through the apertures in the distribution ring. Thus the hot gases are distributed evenly around the inner enclosure to heat the welded joint for stress relieving. Outlet apertures are provided in the ring for the escape of waste gases from the inner enclosure.

5 Claims, 2 Drawing Figures

HEAT TREATMENT APPARATUS

This invention relates to heat treatment apparatus for heat treating a circumferentially continuous portion of a body. More particularly the invention is concerned with stress relieving circumferentially extending welds connecting two pipes or cylindrical bodies together.

It is desirable that a welded joint between two metal components should be stress relieved after the weld has been made. The joint may be stress relieved by heating to a temperature within the range 600°–650°C, and maintaining this temperature for a predetermined time interval. The actual temperature to which the weld is heated is determined by the material of the components welded together and the length of the time interval for which the welded joint is maintained at this temperature is dependent upon the thickness of the metal components welded together.

According to this invention heat treatment apparatus for heat treating a circumferentially continuous portion of a body includes a tubular casing which defines a circumferentially continuous channel, an inlet port and an outlet port, the casing being adapted to co-operate with the circumferentially continuous surface portion so that the walls of the channel and the circumferentially continuous surface portion together comprise walls of a toroidal enclosure, the apparatus being arranged so that hot gases introduced into the channel through said inlet port during use of the apparatus are distributed evenly throughout said toroidal enclosure and are exhausted through the outlet port.

Preferably the apparatus includes a perforated ring which extends from wall to wall of the channel and separates a toroidal chamber from the mouth of the channel, the inlet port opening into the toroidal chamber which is between the perforated wall and the base of the channel, and the outlet port being formed in a wall of the channel between the perforated ring and the mouth of the channel.

The holes of the perforated ring may comprise a circumferential array.

According to a preferred embodiment of the invention there is provided heat treatment apparatus for heat treating a circumferentially extending welded joint between two cylindrical pipe portions, the apparatus including an annular casing which defines an annular channel, an inlet port and an outlet port, the casing being adapted to co-operate with the circumferentially extending surface portion including the welded joint so that the walls of the channel and the surface portion together comprise walls of an annular enclosure, the apparatus being arranged so that hot gases introduced into the annular channel through said inlet port during use of the apparatus are distributed evenly throughout said annular enclosure and are exhausted through said outlet port.

The axis of the inlet port may be tangential to a circle which has its center on the axis of the annular casing. The apparatus may include a tubular component for use in combination with the annular casing during the heat treatment of a welded joint between two pipe portions, the tubular component being located on the opposite side of the welded joint from the annular casing so that the adjacent portions of the two pipes welded together by the welded joint are clamped between the annular casing and the tubular component. Preferably the tubular component is arranged to be inserted into the interior of the pipes.

Figure 2:
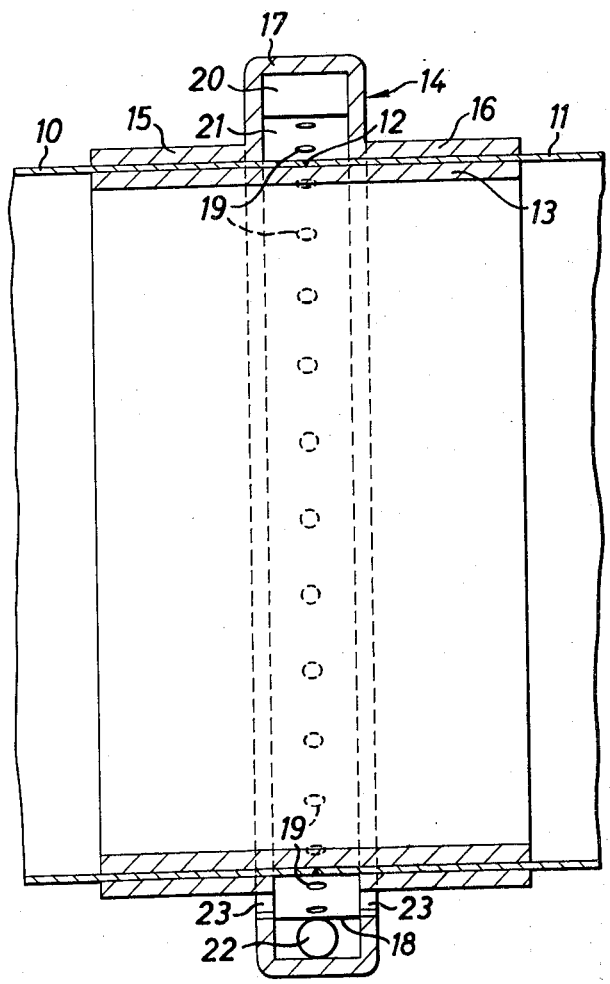

One embodiment of this invention will be described now by way of example with reference to the accompanying drawings of which:

FIG. 1 is a transverse section through heat treatment apparatus according to this invention; and FIG. 2 is a section on the line II—II of FIG. 1.

Referring to FIG. 2 of the accompanying drawings, two pipes 10 and 11 have their abutting ends welded together by a weld 12. After welding, the welded joint is placed in heat treatment apparatus according to this invention.

The heat treatment apparatus comprises an inner tubular component 13 which is inserted into the interior of the two pipes 10 and 11 and positioned so as to extend axially on each side of the weld 12. The heat treatment apparatus incudes also an outer annular casing 14 which comprises two tubular end portions 15 and 16 interconnected by a channel section portion 17. The welded pipes are inserted into the central aperture of the annular casing 14 and located so that the welded joint 12 is positioned substantially centrally within the mouth of the channel section portion 17. A circumferentially continuous ring 18 extends from one to the other of the two side walls of the channel section portion 17 substantially midway between the base and the mouth of the channel section portion 17. A circumferential series of holes 19 in the ring 18 place the annular chamber 20 formed between the ring 18 and the base of the channel section portion 17 in communication with the annular enclosure 21 defined between the ring 18 and the portions of the welded tubes 10 and 11 which extend across the mouth of the channel section portion 17.

Referring to FIG. 1, two inlet ducts 22 open into diametrically opposite parts of the base of the channel section portion 17. Each inlet duct 22 serves as an inlet port and has its axis extending tangentially to a circle which has its center on the axis of the annular casing. Each side wall of the channel section portion 17 has two apertures 23 formed therein at substantially diametrically opposite points. The apertures 23 open into the annular enclosure 21 and serve as outlet ports.

In use of the apparatus hot gases from any suitable source are injected at high velocity through the inlet ducts 22 into the annular chamber 20. The hot gases so injected are distributed evenly around the annular chamber 20 and passed to the annular closure 21 via the holes 19. The size and spacing of the holes 19 are selected so that the hot gases are directed onto the circumferentially extending weld 12 so as to heat the circumferentially extending weld substantially uniformly throughout. The hot gases exhaust to atmosphere from the annular enclosure 21 via the outlet ports 23. Thermocouples may be placed on the portions of the pipes 10 and 11 extending across the mouth of the channel section portion 17 so that the temperature of those pipe portions can be monitored.

The hot gases fed to the inlet ducts 22 may comprise the products of combustion within gas or oil burners or alternatively from a gas turbine generator, both of which are schematically illustrated in FIG. 1.

What we claim is:

1. Heat treatment apparatus for heat treating a circumferentially extending welded joint between two cylindrical pipe portions, including a tubular casing which defines a circumferentially continuous channel, a perforated ring which extends from wall to wall of the channel and separates a toroidal chamber from the mouth of the channel, the toroidal chamber being defined between the perforated ring and a base of the channel, an inlet port which opens into the toroidal chamber, an outlet port formed in a wall of the channel between the perforated ring and the mouth of the channel, and a source of hot gas connected to the inlet port for injecting hot gases at high velocity through the inlet port, the apparatus being arranged so that hot gases introduced into the channel through said inlet port during use of the apparatus are distributed evenly throughout said toroidal chamber and are exhausted through the outlet port, so that the circumferentially extending surface portion including the welded joint which extends across the mouth of the channel is heated evenly and uniformly.

2. Heat treatment apparatus as claimed in claim 1, wherein the holes of the perforated ring comprise a circumferential array.

3. Heat treatment apparatus as claimed in claim 1, wherein the axis of the inlet port is tangential to a circle which has its center on the axis of the tubular casing.

4. Heat treatment apparatus as claimed in claim 3, including a tubular component for use in combination with the tubular casing during the heat treatment of the welded joint, the tubular component being located on the opposite side of the welded joint from the tubular casing so that the adjacent portions of the two pipes welded together by the welded joint are clamped between the tubular casing and the tubular component.

5. Heat treatment apparatus as claimed in claim 4, wherein the tubular component is arranged to be inserted into the interior of the pipes.

* * * * *